United States Patent [19]

Bair

[11] Patent Number: 5,482,773
[45] Date of Patent: Jan. 9, 1996

[54] ACTIVATED CARBON-CONTAINING FIBRIDS

[75] Inventor: Thomas I. Bair, Wilmington, Del.

[73] Assignee: E. I. Du Pont de Nemours and Company, Wilmington, Del.

[21] Appl. No.: 401,326

[22] Filed: Mar. 9, 1995

Related U.S. Application Data

[63] Continuation of Ser. No. 160,630, Dec. 2, 1993, abandoned, which is a continuation of Ser. No. 724,211, Jul. 1, 1991, abandoned.

[51] Int. Cl.$^6$ .............................. B32B 9/00; D02G 3/00; B01D 15/04; C02F 1/42
[52] U.S. Cl. ................... 428/368; 428/367; 428/372; 428/402; 210/638; 264/11
[58] Field of Search .................... 428/368, 372, 428/367, 402; 210/638; 264/11

[56] References Cited

U.S. PATENT DOCUMENTS

| | | | |
|---|---|---|---|
| 2,845,962 | 8/1958 | Bulgin | 139/420 |
| 2,999,788 | 9/1961 | Morgan | 162/146 |
| 4,127,481 | 11/1978 | Malchesky et al. | 210/638 |
| 4,187,143 | 2/1980 | Sander et al. | 162/157 |
| 4,210,615 | 7/1980 | Engler et al. | 264/11 |
| 4,219,512 | 8/1980 | Sinn et al. | 264/11 |
| 4,395,458 | 7/1983 | Huag | 428/372 |
| 4,397,907 | 8/1983 | Rosser et al. | 428/240 |
| 4,493,751 | 1/1985 | Cherdron et al. | 162/157.2 |
| 4,510,193 | 4/1985 | Blücher et al. | 428/196 |
| 4,535,004 | 8/1985 | Haas et al. . | |
| 4,670,341 | 6/1987 | Lundsager | 428/372 |
| 4,748,065 | 5/1988 | Tanikella | 428/152 |
| 4,840,838 | 6/1989 | Wyss | 428/234 |
| 4,840,840 | 6/1989 | Flynn et al. | 428/283 |
| 4,957,794 | 9/1990 | Bair | 428/74 |
| 5,086,108 | 2/1992 | Hornsby | 524/440 |
| 5,141,643 | 8/1992 | Breitbach et al. | 210/503 |

FOREIGN PATENT DOCUMENTS

| | | |
|---|---|---|
| 0031719 | 7/1981 | European Pat. Off. . |
| 0301772 | 2/1989 | European Pat. Off. . |
| 0386975 | 9/1990 | European Pat. Off. . |
| 0446870 | 9/1991 | European Pat. Off. . |
| 57-27206 | 6/1982 | Japan . |
| 57-167495 | 10/1982 | Japan . |
| 58-49968 | 11/1983 | Japan . |

OTHER PUBLICATIONS

Nonwovens Industry pp. 8 & 10.
"Calgon" Type PCB Granular Carbon 23–108b Feb. 1986.

*Primary Examiner*—George F. Lesmes
*Assistant Examiner*—Terrel Morris

[57] ABSTRACT

Polymeric fibrids containing embedded activated carbon are useful as adsorbents.

7 Claims, 1 Drawing Sheet

ACTIVATED CARBON-CONTAINING FIBRIDS

This is a continuation of application Ser. No. 08/160,630, filed Dec. 2, 1993, now abandoned which is a continuation of Ser. No. 07/724,211 filed Jul. 1, 1991, now abandoned.

BACKGROUND OF THE INVENTION

Wet-laid nonwoven sheets of synthetic polymeric fibrids and short length staple fibers are known from U.S. Pat. No. 2,999,788. As taught in said patent, the fibrids are prepared by shear precipitation of solutions of the polymer, preferably in an aqueous medium which extracts the polymer solvent and causes the polymer to come out of solution. Generally, the fibrids are readily converted into paper by paper-forming techniques similar to those employed with wood pulp.

Activated carbon is well-known to be useful in removing impurities from air, water and solvents because of its very high microporous surface area (>500 $m^2/g$). In large industrial systems, beds of loose carbon are commonly used for removing impurities from gaseous and liquid streams. In smaller operations, fibrous systems (e.g. felts, papers) in which carbon is mechanically entrained or adhesively attached, are often used.

Fibrous systems employing mechanically entrapped carbon particles are invariably "dirty". That is, the fibrous matrix sheds small particles when pulsed, shaken, or "worked". The shed particles are messy and can interfere with electrical equipment because they are conductive.

To help alleviate the shedding problem, low porosity fibrous sheets can be bonded to the face of the fibrous system or the fibrous system can be impregnated with a resin. These methods increase the pressure drop needed to maintain flow and do not completely solve the shedding problem, especially if the fibrous system is vigorously worked.

Non-shedding, high porosity structures can be obtained by affixing carbon particles to the fibers of high-loft nonwovens with an adhesive. However, the adhesive reduces the activity of the carbon. Also, the method is suitable only for a highly open porous fiber matrix wherein the carbon particles can penetrate into the center of the structure.

The present invention deals with the aforementioned problems.

THE DRAWINGS

FIG. 1 is a plot of $CCl_4$ adsorption activity in percent versus surface area in square meters per gram.

SUMMARY OF THE INVENTION

This invention provides adsorbents comprising polymeric fibrids containing embedded activated carbon. Also encompassed are wet-laid composite sheet structures comprising papers of such fibrids with or without short staple fibers, or mats of such fibrids and fiber fluff and composite sheet structures formed by hydrolacing such fibrids with synthetic fibers. The fibrids of the invention preferably contain from about 40 to 85 weight percent, more preferably at least 65 weight percent of activated carbon and have a surface area of at least 200 $m^2/g$. Also encompassed by this invention are processes of using the fibrids.

DETAILED DESCRIPTION OF THE INVENTION

Figure 1:
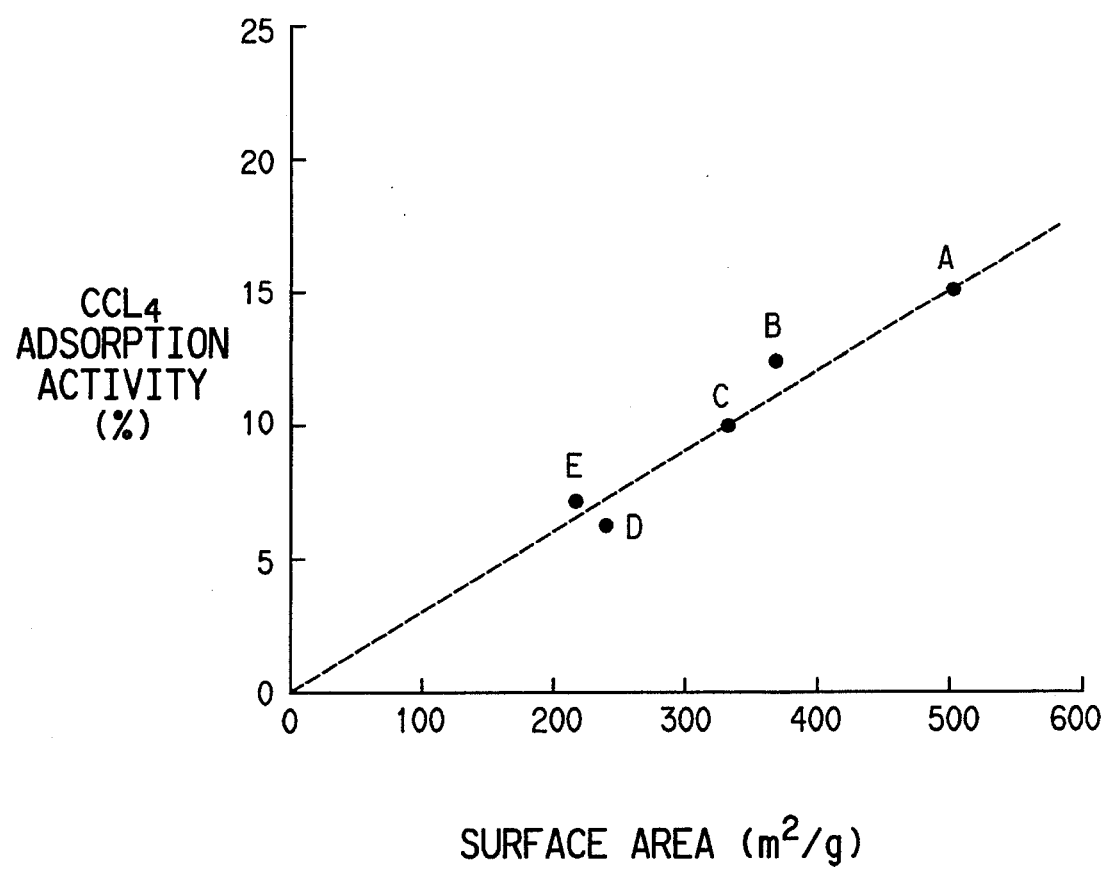

This invention provides activated carbon-loaded fibrids which have high surface area and adsorption activity. The fibrids can be tightly bound in fibrous articles especially by wet-laying techniques or by hydrolacing with staple fiber. Even though the carbon which constitutes part of the polymeric fibrid structure is completely encapsulated by the polymer, the microporous surface area of the fibrids is substantially greater than that of the non-loaded fibrid. This surprising result is believed due to micro-voids in the fibrids. These tiny voids allow fluids to pass through the polymer and impurities in the fluids to become adsorbed on the carbon particles. The fibrids of this invention are not electrically conductive.

As with pure activated carbon, the fibrids of this invention exhibit high $CCl_4$ adsorption activity. In general, the level of adsorption activity parallels the level of microporous surface area. Because of their high activity, the loaded fibrids of this invention are especially useful for removing volatile organic compounds (VOC's) from air and dissolved impurities from water. Certain of the nonwoven sheet structures containing the fibrids are useful for combined particle filtration and impurity adsorption.

The extent of loaded fibrid activity is dependent upon the surface area and activity of the carbon powder before loading and the amount of carbon powder in the fibrid. Preferred carbon powders pass a 60-mesh screen while most preferred powders pass a 325-mesh screen and have a microporous surface area >500 $m^2/g$ preferably >1000 $m^2/g$. Carbon-loaded fibrids of this invention possess surprisingly high (>200 $m^2/g$) surface area, and absorb and retain greater than 4% by weight carbon tetrachloride vapor by the adsorption test described below. The surface area of >200 $m^2/g$ is substantially higher than that of 100% polymer fibrids known in the art. The adsorption activity is superior to commercial air filters in which an equivalent amount of active carbon is bound adhesively to a fiber matrix.

The production of fibrids from a variety of synthetic organic polymers is well known. Many patents describe such manufacture and indeed also disclose incorporation of fillers (see Morgan U.S. Pat. No. 2,999,788). Among the various polymers suitable for fibrids of the invention are polyacrylonitrile and copolymers thereof, polystyrene, cellulose esters, e.g., cellulose acetate, aramids such as poly (m-phenylene isophthalamide) (MPD-I) and poly(p-phenylene terephthalamide) (PPD-T) etc., to name a few. The present invention incorporates activated carbon in the polymeric fibrid during its manufacture. More specifically, activated carbon in the desired amount is mixed in with a solution of the polymer to be converted to fibrid form. The mixture is then introduced with vigorous agitation into a liquid preferably water or other aqueous solution which is miscible with the polymer solvent but in which the polymer is insoluble. The fibrids which form are then collected for subsequent use. The fibrids containing the activated carbon may be used in the same general-manner as activated carbon granules, as in a column. In such form, the activated carbon is protected against break-up in use and yet surprisingly is found to have high activity by virtue of the fact that its porosity is substantially retained even though it is a component of the fibrid. One skilled in the art would have expected that the pores of the activated carbon would be covered by polymer.

While the presence of even small amounts of activated carbon in the fibrids will be useful, it is more desirable to include at least about 40 to 85 wt. percent, preferably at least 65 wt. percent of the activated carbon based on total fibrid weight (i.e. polymer plus carbon) to obtain maximum effect with minimum material. Advantages of weight reduction and reduced pressure drop for a given amount of active carbon are among the reasons for using higher levels of the activated carbon.

This invention also provides non-shedding, fibrous sheet structures containing carbon-loaded fibrids which are suitable for separating gaseous impurities from air and dissolved impurities from water and other liquids. Contemplated are wet-laid composite sheet structures comprising papers of the loaded fibrids with or without short staple fiber and wet-laid mats of such fibrids and fiber fluff with or without short staple fiber. Also intended are composite sheet structures formed by hydrolacing the loaded fibrids with synthetic fibers. Such fibrous sheet structures can be made by conventional forming methods. High levels of carbon can be incorporated into structures with a wide range of densities and air permeability without the need for adhesives. The level of activity of the fibrous structures is dependent upon their fibrid content and the activity of the loaded fibrids. It is desirable that sufficient fibrids be used such that the percentage of activated carbon in the sheet structures be at least 20%. Sheet structures of this invention adsorb at least 4% by weight $CCl_4$ and have a surface area of at least 50 $m^2/g$.

Wet-laid papers can be made entirely from the aforementioned loaded fibrids, or from a mixture of the loaded fibrids and short fiber (floc) by conventional paper making processes. The floc, if used, is preferably of ¼ in. to ¾ in. cut length. The polymer composition of the floc is not critical and acceptable floc compositions include aramids, nylons, polyesters, polyacrylonitrile, etc.

Papers from 100% of the loaded fibrids of this invention have high adsorption activity (>4% $CCl_4$) and high surface area (>200 $m^2/g$). Those having low tensile strength are particularly useful in the preparation of hydrolaced fabrics because they disintegrate readily in the hydrolacing process while those with higher strengths are more suited for air and for water purification.

Air permeable papers are made by wet-laying a mixture of floc with the loaded fibrids. Suitable mixtures contain 10% to 50% floc and even more. Permeability can be adjusted by varying the percentage of floc in the paper and by changing the basis weight of the paper. Thus, one can prepare papers with air permeabilities ranging from 0.3 to 30 $m^3/min/m^2$ by judicious selection of these variables. Papers with low air permeability (i.e., <3 $m^3/min/m^2$) are mostly suited for filtering of small particles (e.g., <1 micron), as well as, adsorption of volatile organic compounds (VOC's). They are also useful for filtering liquid media to improve color, odor, and taste.

Papers with high air permeability (i.e., >7.5 $m^3/min/m^2$) are useful where low pressure drops and high fluid flows per unit area are desired. Generally, these papers are less efficient filters than those of lower permeability and are most useful for filtering relatively large particles.

Low density wet-laid mats useful for air filtration, odor adsorption, and liquid filtration can be made from fibrids and fiber fluff of aramid fibers using conventional paper-making processes. Suitable fiber fluff of aramid fibers and mixtures with thermoplastic fibers are described in U.S. Pat. No. 4,957,794. Useful polymeric fluffs include poly(m-phenylene isophthalamide), poly(p-phenylene terephthalamide), and mixtures thereof. As with other sheet structures, the activity level of the mat depends on the amount of loaded fibrids used and their activity. The permeability and tensile strength of the mat are dependent upon the mat basis weight, bulk density, and percentage of fibrids used. By varying these parameters, one skilled in the art can prepare cohesive mats with air permeability ranging from 1.5 to 30 $m^3/min/m^2$. Even lower permeability can be achieved by densifying the mats as by passing them between high pressure rolls.

Optionally, fiber floc can be added to the mixture of fiber fluff and loaded fibrids in order to increase the tensile strength of the mat. Aramid floc is especially useful when mats for high temperature filtration are desired. Thermoplastic floc is especially useful for preparing active mats which can be thermally shaped and set to various geometric shapes. Useful amounts of fiber floc range from 2% to 50% (preferably 10% to 30%) of the total composite weight.

The aforementioned mat structures are useful as filter media for both particle filtration and organic vapor adsorption. They are especially useful as air-duct filters, cooking-range filters, air-conditioner filters, and shoe insoles for absorption of vapors, odors, etc.

Very high-strength, adsorbent fabrics have been made by coentangling the carbon-loaded fibrids with carded webs by use of high pressure water streams. The resulting nonwoven structures have good drape and can be sewn into various convenient forms, such as bags, for air and water purification. They can be prepared by tying the fibrids into carded staple fiber webs. For example, a paper sheet of loaded fibrids may be layered between two carded webs, and high pressure water jets applied (hydrolacing). The fibrid paper is broken apart by the water jets to generate loose fibrids which become inter-entangled with the interlocking fibers of the carded webs. Although papers containing both fibrids and floc can be used, papers composed of 100% fibrids are preferred because of their higher activity and the relative ease with which they can be broken into individual or small clumps of fibrids by the water jets. Optionally, papers comprised of mixtures of carbon-loaded and non-loaded fibrids can be used. Hydrolacing is performed by techniques shown in U.S. Pat. Nos. 3,493,462; 3,508,308; 3,560,326; and 3,620,903.

Suitable carded webs can be made from polymeric fibers of polyester, nylon, rayon, aramids, polyacrylonitrile, etc. using conventional textile carding processes. Suitable fiber deniers range from 0.5 dpf to 8 dpf, preferably 1 dpf to 3 dpf. Preferred staple cut length ranges between ¼in. to 3 in., most preferred is staple of ¾-in. to 2 in. cut length. If desired, webs containing staple fiber of mixed polymer composition and denier are suitable. Products having a basis weight of from 1–10 $oz/yd^2$ are useful.

Tests and Measurements $CCl_4$ adsorption activity is measured as follows:

A weighed sample of dried fibrids or article is placed in a vacuum oven at 160° C. for 2 hours and then allowed to set open to the atmosphere at room temperature for 1 hour. The sample is weighed and then exposed to an air atmosphere saturated with carbon tetrachloride vapor at room temperature for 2 hours. The exposed fibrids are then allowed to set open to the atmosphere for 2 hours at room temperature and then re-weighed. The retained pick-up of $CCl_4$ is determined by subtracting the weight of the fibrids before exposure to $CCl_4$ from their weight after exposure and after setting for 2 hrs. The $CCl_4$ adsorbed is then expressed as a percentage of the unexposed weight. Surface area is measured as follows:

Surface area of fibrous material is determined from nitrogen adsorption by the method of Baunner, Emmet, and Teller (BET) using a Model 2100 Surface Area Pore Volume Analyzer sold by Micromeritics Instruments Corp., Norcross, Ga., USA. The fibrous material was conditioned for the test by exposing it to a vacuum of less than 0.1 torr for about 16 hours at about 80° C. Air Permeability is measured as follows:

Air permeability of a fibrous article is determined under ambient conditions using a Fabric Permeability Machine sold by Frazier Precision Instrument Co., Gaithersburg, Md., USA. In conducting the test, air flow measurements are taken using a pressure differential of about 0.5 inches of water at several different regions of a sample, and the measurements are averaged.

The following examples are illustrative of this invention and are not intended as limiting.

EXAMPLE 1

This example demonstrates the preparation of carbon-aramid fibrids having very high surface area and $CCl_4$ adsorption activity.

Dimethylacetamide (100 gms) was mixed with 100 gms of a solution comprised of 14 gms MPD-I, 76 gms dimethylacetamide, and 10 gms calcium chloride. Forty grams of activated carbon (Type PCB-G obtained from Calgon Carbon Corp. of Pittsburg, Pa.) was added with stirring until a uniform mixture was obtained. The mixture was then poured slowly into vigorously stirred water (about one pint) in a Waring blender.

The resulting solid fibrids were collected on a Buchner funnel and washed thoroughly by successive amounts of water. A small portion of the black, homogeneous residue was dried in a vacuum oven at about 120° C. The surface area (B.E.T. method) of the dried fibrids was 598 square meters per gram. A portion of the activated carbon was found to have a surface area of 994 square meters per gram. Thus, the activated carbon encapsulated in the aramid polymer was accessible and retained about 90% of its surface area.

Fibrids of encapsulated activated carbon were prepared similarly to the above except that the ratio of activated carbon to MPD-I was (1) 4:1, (2) 5:1, (3) 6:1, (4) 1:1, and (5) 3:1. Surface area of the fibrids were as follows:

| Item | Surface Area |
| --- | --- |
| 1 | 727 |
| 2 | 761 |
| 3 | 788 |
| 4 | — |
| 5 | — |

The $CCL_4$ adsorption activity was as follows:

| Item | $CCl_4$ Adsorption Activity (%) |
| --- | --- |
| 1 | — |
| 2 | — |
| 3 | — |
| 4 | 15.2 |
| 5 | 20.6 |

EXAMPLE 2

This example demonstrates the preparation of carbon-aramid fibrids and shows their high surface area and high $CCl_4$ adsorption activity compared to fibrids not containing encapsulated carbon.

A mixture containing dimethylacetamide (72%), MPD-I (6%), calcium chloride (4%) and activated carbon (18%) was continuously precipitated by mixing with water in a high-shear fibridator such as described in U.S. Pat. No. 3,018,091. The resulting fibrids were washed free of dimethylacetamide with water and the black homogeneous product collected on a drum filter. A portion of the black fibrids was dried in a vacuum oven at about 120° C.

A portion (3.00 gms) of the dried fibrids was mixed with 100 ml of dimethylacetamide containing 3% calcium chloride to dissolve away the MPD-I portion of the fibrids. The remaining material, suspended activated carbon, was collected on a filter funnel and washed free of residual MPD-I with several portions of dimethylacetamide. The carbon residue was dried in a vacuum oven at about 120° C. The dried activated carbon weighed about 2.10 gms., or 70% of the original fibrids.

The surface area of another portion of the dried fibrids was found to be 603 square meters per gram compared to 1104 square meters per gram or a sample of pure activated carbon. Thus, about 78% of the pure carbon surface area is retained and accessible to the encapsulated carbon. Fibrids prepared similarly to the above, except that they contained no activated carbon had a surface area of only 32.1 square meters per gram.

Another portion of the dried fibrids exhibited a carbon tetrachloride adsorption activity of 18.3%. A portion of 100% PCB-G activated carbon was treated similarly and found to have a carbon tetrachloride activity of 32.0%. A portion of 100% MPD-I fibrids was treated similarly and found to have a $CCl_4$ activity of 0%. Thus, the encapsulated activated carbon was accessible and retained about 82% of the activity of pure activated carbon.

EXAMPLE 3

This example demonstrates the suitability of polymers other than MPD-I. Specifically, cellulose acetate (CA), polystyrene (PS), and poly-acrylonitrile (ANP).

Mixtures composed of activated carbon suspended in solutions of various polymers as shown below were fibridated as in Example 1. The fibrids after drying were homogeneous and the carbon was fully encapsulated in the polymer matrix:

| | Polymer | | |
| --- | --- | --- | --- |
| Item | Type | Amount (gms) | Carbon (gms) | DMAc (gms) |
| 1 | ANP | 80 | 120 | 720 |
| 2 | ANP | 6 | 0 | 94 |
| 3 | PS | 8 | 12 | 106 |
| 4 | PS | 9 | 0 | 141 |
| 5 | CA | 10 | 20 | 157 |
| 6 | CA | 10 | 30 | 157 |
| 7 | CA | 10 | 40 | 157 |
| 8 | CA | 10 | 0 | 157 |

The dried fibrids had $CCl_4$ adsorption activity as follows:

| Item | $CCl_4$ Adsorption Activity (%) |
| --- | --- |
| 1 | 16.7 |
| 2 | 0 |

-continued

| Item | CCl$_4$ Adsorption Activity (%) |
| --- | --- |
| 3 | 18.3 |
| 4 | 1.2 |
| 5 | 19.6 |
| 6 | 21.1 |
| 7 | 21.6 |
| 8 | 0.4 |
| PCB-G Carbon | 32.0 |

Thus, the adsorption activity of the fibrids with encapsulated activated carbon is vastly higher than the fibrids comprised of 100% polymer and, in spite of being encapsulated in a polymer matrix, the activated carbon retains about 85%–95% of its activity in the pure state.

EXAMPLE 4

This example demonstrates the preparation of adsorbent papers from activated-carbon fibrids.

Fibrids prepared as in Example 2 were mixed with water in a Jones Sharkle pulper at a consistency of 0.71% solids. This mixture was pumped to the headbox of a Fourdrinier paper machine equipped with a dryer section having 12 Sandy Hill dryer cans. The mixture was diluted at the headbox to 0.044% solids and then formed continuously into a paper by conventional methods at a speed of 7.5 meters per minute. The dry paper (A) had a basis weight of 152.6 g/m$^2$, and a CCl$_4$ adsorption activity of 15%. Surface area was 506 square meters/gram.

Another paper (B) was made similarly to the above paper except that final dilution was 0.05% solids, and the solids were composed of 80% fibrids and 20% of ¼-inch MPD-I floc. The resulting paper was 111.9 /gm$^2$ and had a CCl$_4$ adsorption activity of 16.8%.

EXAMPLE 5

This example illustrates the preparation of an adsorbent, hydrolaced non-woven fabric from activated carbon fibrids.

A paper of about 237.3 g/m$^2$ prepared similarly to that of Example 4A was placed between a carded web of polyethylene terephthalate fibers (38.1 mm cut length, 1.5 denier) 40.7 g/m$^2$ and one of 20.3 g/m$^2$. The layered structure was then hydrolaced to yield a drapeable, sewable fabric of 257.6 g/m$^2$. Fabric thickness is 1.8 mm. Air permeability is 7.6 m$^3$/min/m$^2$ and CCl$_4$ adsorption activity is 10.3%. Similar results can be expected where the polyester fibers are replaced with poly(m-phenylene) isophthalamide fibers.

EXAMPLE 6

This example demonstrates a second type of activated carbon, "Darco" useful for preparing active fibrids.

Dimethylacetamide (371 grams) was mixed with 200 grams of a solution comprised of 28 grams of MPD-I, 152 grams dimethylacetamide, and 20 grams calcium chloride. Eighty grams of activated carbon powder ("Darco", obtained from Aldrich Chemical Co.) was added with stirring until a uniform mixture was obtained. The mixture was then poured slowly into vigorously stirred water (about one pint) in a Waring Blender.

The solids were collected on a Buchner funnel and washed with successive amounts of water to remove traces of dimethylacetamide. The damp fibrids were homogeneous and weighed 500 grams. The solids level was found to be 24% by drying a small portion of the fibrids in a vacuum oven. The dried fibrids had a surface area of 245 square meters per gram and a CCl$_4$ adsorption activity of 4%.

EXAMPLE 7

This example demonstrates the preparation of papers from activated-carbon fibrids.

Fibrids prepared as in Example 2 were mixed with water and pumped to the headbox of a Rotoformer machine equipped with an extended wire table. At the head box, the stream of fibrids was combined with a second stream composed of a mixture of water and 6 mm cut length fibers of vinyl chloride/vinyl acetate copolymer (sold by Wacker Chemicals of New Canaan Ct. as paper grade Wacker MP Fibre), and a third stream composed of a mixture of water and fluff of poly(meta-phenylene isophthalamide) (as described in U.S. Pat. No. 4,957,794). The flow rates and solids content of each stream were adjusted such that the combined mixture was composed of 67% fibrids, 20% fluff, and 13% fiber. The combined streams were formed into a continuous wet-laid mat of conventional methods at 25 feet per minute (7.7 meters per minute). The wet mat was dried on a flow-through dryer at 345° F. (173.9° C.). The mat had a CCl$_4$ adsorption activity of 17.5%, and an air permeability of 20.5 m$^3$/min/m$^2$. The mat had a basis weight of 213.6 grams/sq meter, and a thickness of 2.37 mm.

EXAMPLE 8

This example demonstrates the direct relationship between surface area and CCl$_4$ adsorption for sheet structures.

Various papers were prepared similarly to those of Example 4, except that the ratio of ¼-inch (6 mm) MPD-I floc to fibrids was 0, ⅓, and 1.0. Surface area and CCl$_4$ adsorption activity was determined for each paper and the results tabulated below:

| Item | Floc/Fibrid Ratio | Basis Weight (g/sq meter) | CCl$_4$ Activity (%) | Surface Area (Sq Meter/g) |
| --- | --- | --- | --- | --- |
| A | 0 (No floc) | 152.6 | 15.0 | 506 |
| B | ⅓ | 61.0 | 12.4 | 369 |
| C | ⅓ | 27.1 | 9.9 | 330 |
| D | 1 | 33.9 | 6.7 | 236 |
| E | 1 | 23.7 | 7.4 | 216 |

A plot of CCl$_4$ adsorption activity versus surface area is illustrated in FIG. 1.

The measured values of CCl$_4$ adsorption activity and surface area for each of Items A–E were plotted in FIG. 1. Use of the curve allows for a reasonable approximation of one value when the other is known for papers containing fibrids of the invention.

I claim:

1. A non-shedding sheet structure consisting essentially of aramid fibrids, activated carbon particles having a surface area of at least 500 m$^2$/g, and from about 2% to 50% by weight fiber floc wherein the activated carbon particles are encapsulated within the fibrids, by the process steps of: dispersing in a mixture containing a solvent and dissolved aramid polymer, carbon particles such that the weight ratio of carbon to polymer in the mixture is from 1:1 to 6:1 and introducing the mixture under vigorous stirring into a liquid which extracts the solvent and causes the polymer to precipitate as fibrid structures encapsulating the activated carbon particles such that the activated carbon particles retain 85 to 95% of their absorbent capacity per gram of carbon compared to that of a control as measured by the adsorption and retention of carbon tetrachloride vapor.

2. The sheet structure according to claim 1 wherein the fibrids contain at least 65% by weight of activated carbon particles.

3. The sheet structure of claim 1 wherein the surface area of the sheet is at least 50 m²/g.

4. A sheet structure according to claim 1 wherein said fiber floc is polymeric fibers, said sheet structure having a surface area of at least 50 m²/g.

5. A sheet structure according to claim 1 wherein said fiber floc is polyethylene terephthalate fibers, said sheet structure having a surface area of at least 50 m²/g.

6. A sheet structure according to claim 1 further including polymeric fluff, said sheet structure having a surface area of at least 50 m²/g.

7. A sheet structure according to claim 6 wherein said polymeric fluff is poly(m-phenylene isophthalamide), said sheet structure having a surface area of at least 50 m²/g.

* * * * *